UNITED STATES PATENT OFFICE.

ERNEST L. RANSOME, OF SAN FRANCISCO, CALIFORNIA.

IMPROVEMENT IN PROCESSES OF MANUFACTURING ARTIFICIAL STONE.

Specification forming part of Letters Patent No. 145,363, dated December 9, 1873; application filed October 18, 1873.

*To all whom it may concern:*

Be it known that I, ERNEST LESLIE RANSOME, of England, and now residing in San Francisco, State of California, United States, have invented new and useful Improvements in the Removal of Soluble Salts from Artificial Stone and other substances, of which the following is a specification:

My present invention is an improvement based upon the principle of my Patent No. 108,627, dated October 25, 1870, (in which I claim "A current of steam in removing soluble salts from the Ransome and other artificial stone;") and it consists of the use of a current of air and steam, or of air and water, or of air alone, instead of the use of steam alone, as already patented by me; and by such use of air I obtain better results at a less cost than can, in a general way, be obtained by the use of steam alone.

My ordinary mode of procedure is as follows: The article to be treated having been placed in a suitable position, either in a closed or open chamber, or upon a floor or other support, I first pass a current of air through the pores thereof by any convenient means, such as have hitherto been used for the same purpose when water or steam has been employed, or by many of the methods now used for hardening the same; and when the greater part of the soluble salts has been thus blown out, I admit, with the air, a current of water or steam, so as to more thoroughly remove the remaining salts. The temperature and pressure of the air, steam, and water may be varied to suit the article under treatment, it being generally desirable to maintain them as high as economy and the temperature and strength of the stone admit.

By this process the soluble salts can be collected in a more concentrated and valuable form than by any other known method.

I am aware that Ransome, Bessemer, and Ransome have included in a patent the use of a current of air; but in that patent they claim the use of a current of air for displacing the moisture and drying the stone after all the soluble salts in the stones have been removed therefrom by washing, whereas the whole and only benefit of the current of air as used by me is to remove the said soluble salts from the stone; and I do not claim or use in this improvement the air for displacing the moisture in order to dry the stone, nor do I dry the stone therewith.

What, therefore, I claim as new and valuable is—

The process herein described of removing soluble salts or other valuable liquids from artificial stone by means of a current of air, substantially as set forth.

ERNEST LESLIE RANSOME.

Witnesses:
JOHN WIGMORE,
J. G. CLARK.